United States Patent
Wegmann et al.

(10) Patent No.: US 9,374,720 B2
(45) Date of Patent: Jun. 21, 2016

(54) OPTIMIZING COOPERATION AREAS AND COVER SHIFTS IN CELLULAR COMMUNICATIONS NETWORK SYSTEMS

(75) Inventors: Bernhard Wegmann, Holzkirchen (DE); Michael Faerber, Wolfratshausen (DE); Bernhard Raaf, Neuried (DE); Simone Redana, Munich (DE); Sabine Roessel, Munich (DE); Wolfgang Zirwas, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/377,663

(22) PCT Filed: Feb. 20, 2012

(86) PCT No.: PCT/EP2012/052852
§ 371 (c)(1),
(2), (4) Date: Sep. 22, 2014

(87) PCT Pub. No.: WO2013/123963
PCT Pub. Date: Aug. 29, 2013

(65) Prior Publication Data
US 2015/0024776 A1 Jan. 22, 2015

(51) Int. Cl.
*H04W 24/00* (2009.01)
*H04W 24/02* (2009.01)
(Continued)

(52) U.S. Cl.
CPC .............. *H04W 24/02* (2013.01); *H04B 17/27* (2015.01); *H04W 24/10* (2013.01); *H04W 64/003* (2013.01); *H04B 7/022* (2013.01);
(Continued)

(58) Field of Classification Search
CPC ... H04W 24/02; H04W 64/003; H04W 24/10; H04W 16/18; H04B 17/27; H04B 17/318; H04B 17/00; H04B 7/022
See application file for complete search history.

(56) References Cited

U.S. PATENT DOCUMENTS

| 2011/0205964 A1* | 8/2011 | Fix et al. .................... 370/328 |
| 2012/0195238 A1* | 8/2012 | Li .............................. 370/280 |

(Continued)

FOREIGN PATENT DOCUMENTS

WO 2011/054380 A1 5/2011

OTHER PUBLICATIONS

International Search Report and Written Opinion for International Application No. PCT/EP2012/052852, mailed Aug. 3, 2012, 17 pages.

(Continued)

*Primary Examiner* — Erin File
(74) *Attorney, Agent, or Firm* — Brake Hughes Bellermann LLP

(57) ABSTRACT

In a cellular communications network system comprising a plurality of cells including a first cell and second cells different from and present in the neighborhood of the first cell, measurement reports are repeatedly received from user equipments, each including a first signal strength value corresponding to a signal strength measured from the first cell over a short time period and n second signal strength values corresponding to signal strengths measured over the short time period from n second cells, which correspond to the n strongest signal strengths measured from the second cells, n being an integer greater than one. A value of a counter is incremented which corresponds to a potential cooperation area formed by the first cell corresponding to the first signal strength value and the n second cells corresponding to the n second signal strength values.

16 Claims, 5 Drawing Sheets

(51) Int. Cl.
- *H04W 24/10* (2009.01)
- *H04B 17/27* (2015.01)
- *H04W 64/00* (2009.01)
- *H04B 7/02* (2006.01)
- *H04W 16/18* (2009.01)
- *H04B 17/00* (2015.01)
- *H04B 17/318* (2015.01)

(52) U.S. Cl.
CPC .............. *H04B 17/00* (2013.01); *H04B 17/318* (2015.01); *H04W 16/18* (2013.01)

(56) References Cited

U.S. PATENT DOCUMENTS

2013/0329692 A1* 12/2013 Vrzic et al. .................... 370/329
2015/0049824 A1* 2/2015 Kim et al. ..................... 375/267

OTHER PUBLICATIONS

Ralf Weber et al: "Self-Organizing Adaptive Clustering for Cooperative Multipoint Transmission", 2011 IEEE 73rd, IEEE, May 15, 2011, pp. 1-5, XP031896890, DOI: 10.1109/VETECS.2011.5956490 ISBN: 978-1-4244-8332-7 abstract I. Introduction II. Adaptive Clustering Concept and Algorithm (chapter A.) figure 1.

"2 Adaptive eNB Clustering for CoMP", 3GPP Draft; R1-092838—Adaptive Cell Clustering for Comp-Hitachi, No. Los Angeles, USA; Jun. 26, 2009, XP050351278, [retrieved on Jun. 26, 2009] 1 Introduction 2.1 Overview of the approach p. 2, first two sections Ixy matrix on p. 2.

W. Mennerich and W. Zirwas, "User centric coordinated multi point transmission,"(Usercentric Coopertion) in Proceedings of IEEE 72nd Vehicular Technology Conference (VTC2010—Fall), Ottawa, Canada, 2010.

W. Mennerich and W. Zirwas, "Reporting Effort for Cooperative Systems Applying Interference Floor Shaping," in Proceedings of IEEE International Symposium on Personal, Indoor and Mobile Radio Communications (PIMRC'11), Sep. 2011, Toronto, Canada.

* cited by examiner

OPTIMIZING COOPERATION AREAS AND COVER SHIFTS IN CELLULAR COMMUNICATIONS NETWORK SYSTEMS

This application is a national stage entry of PCT Application No. PCT/EP2012/052852, filed on Feb. 20, 2012, entitled "OPTIMIZING COOPERATION AREAS AND COVER SHIFTS IN CELLULAR COMMUNICATIONS NETWORK SYSTEMS", which is hereby incorporated by reference in its entirety.

BACKGROUND OF THE INVENTION

1. Field of the Invention

The present invention relates to optimizing cooperation areas and cover shifts in cellular communications network systems, for example LTE or LTE-A systems.

2. Related Background Art

Prior art which is related to this technical field can e.g. be found in:

[1] W. Mennerich and W. Zirwas, "User centric coordinated multi point transmission," in Proceedings of IEEE 72nd Vehicular Technology Conference (VTC2010-Fall), Ottawa, Canada, 2010.

[2] W. Mennerich and W. Zirwas, "Reporting Effort for Cooperative Systems Applying Interference Floor Shaping," in Proceedings of IEEE International Symposium on Personal, Indoor and Mobile Radio Communications (PIMRC '11), September 2011, Toronto, Canada.

The following meanings for the abbreviations used in this specification apply:
CA cooperation area
CoMP coordinated multi-point
CSI channel state information
eNB evolved node B
ID identity
LTE long term evolution
LTE-A LTE advanced
RSRP reference signal received power
SON self optimizing networks
Tx transmit
UE user equipment In particular, the present invention relates to SON and CoMP as features of LTE-A and beyond. A CoMP transmission is a coherent multi-cell transmission where several data streams are jointly transmitted over the same radio resources from multiple cells to multiple terminals (UEs) within these cells. Under the assumption of complete knowledge of channel state information (CSI) for all jointly used links joint pre-coding of all links will be interference-free decodable.

Cooperation between all cells is not realizable and must be limited to a moderate number of cells, so-called cooperation areas (CAs), since a considerable amount of signaling information has to be exchanged among all cooperating cells as well as CSI for all relevant radio channels has to be fed back by the UEs, where both need to be kept to a manageable amount.

Users benefit the most from CoMP in case of so-called "user centric" cooperation areas, i.e. the CAs should include the strongest cells for each UE as described in reference [1]. However, several disjoint predefined CAs lead to the situation that for several UEs the strongest cells do not belong to one single CA, i.e. UEs have individual sets of their strongest cells. In particular, those UEs at the fringe of the disjoint CAs have a high likelihood for strong cells belonging to a neighboring CA. Since larger CA sizes are not feasible, shifted and overlapping CAs—so called cover shifts—operating on different frequency layers have been proposed e.g. in reference [2]. The determination of the cover shifts goes in hand with optimal antenna tilting e.g. according to the Tortoise concept.

As long as the network layout is regular (hexagon grid) and user traffic is homogeneously distributed both the cooperation areas and the cover shifts can be exactly planned in advance as shown e.g. in FIG. 1. In FIG. 1, different shifts of CAs are marked by different grey-levels: Edges of triangles mark cooperating cell sites, different grey-levels within triangles denote the sub-band a CA is using. From left to right, figures show one, two, three and five shifts.

However, these regular overlapping CA shifts are not applicable in real network deployments where cells look much more unshaped due to deployment and propagation irregularities. In addition, a predetermined partitioning of the resources among cover shifts is per se not adapted to the user and traffic distribution. The planned version is based on assumptions and if the assumptions do not meet real user and traffic distributions the wrong partitioning leads to unwanted capacity shortages in some cover shifts while others have more than needed.

It is to be noted that different cover shifts are defined for orthogonal resources like e.g. different frequency bands or time slots, and even different codes. This resource allocation has to be done ideally network wide as otherwise there will be inter-cover-shift interference at least for that part of the resources where network wide orthogonality is violated.

An additional problem arises if to a running system additional eNBs or pico stations are being added, which in turn will have to be integrated into the already defined cover shifts. In worst case this might lead in terms of optimal setup to a complete reorganization of the cover shifts.

SUMMARY OF THE INVENTION

The present invention aims at overcoming at least part of the above problems and provides an autonomous SON based approach for optimal CoMP area and in particular cover shift deployment.

The autonomous SON based approach is realized by the methods and apparatuses as defined in the appended claims. Embodiments of the invention may also be implemented by a computer program product.

With at least one embodiment of the present invention, a flexible treatment of the cover shifts in terms of irregular spatial CA set-up and flexible radio resource assignment of the cover shifts is enabled.

In the following the invention will be described by way of exemplary embodiments thereof with reference to the accompanying drawings.

DESCRIPTION OF THE EMBODIMENTS

For the above-mentioned autonomous SON based approach, a SON algorithm is introduced, which may use UE measurement reports to develop statistics, e.g. performance counters, per eNB and in a central element of a cellular communications network system, which results in a ranked list of suitable CAs and cover shift combinations.

These statistics can be used to optimize the resource utilization per CA, either by modifying the resource allocation for the CAs or by modifying the allocation of UEs to CAs or both in order to get optimal adaptation to user and traffic behavior.

The SON algorithm may start either from scratch, i.e. no CAs or cover shifts have been configured at all, or after an initial (planned) CA and cover shift setting. The CAs and related cover shifts can be determined and/or re-arranged by the SON algorithm based on the developed statistics of potential CAs.

According to an exemplary embodiment of the invention, the eNBs may generate based on the UE measurement reports a set of counters for potential CAs. In other words, based on the measurement reports an eNB may determine the best CA and increment the counter representing this CA. The needed UE measurement reports may contain a set of momentary, i.e. measured over a short time period, RSRP values of the strongest cells including the serving cell. The RSRP values may be measured for a dedicated tilt constellation of transmit antennas of the cells within the coverage area in question, and may be combined with UE location information if available.

Figure 1:
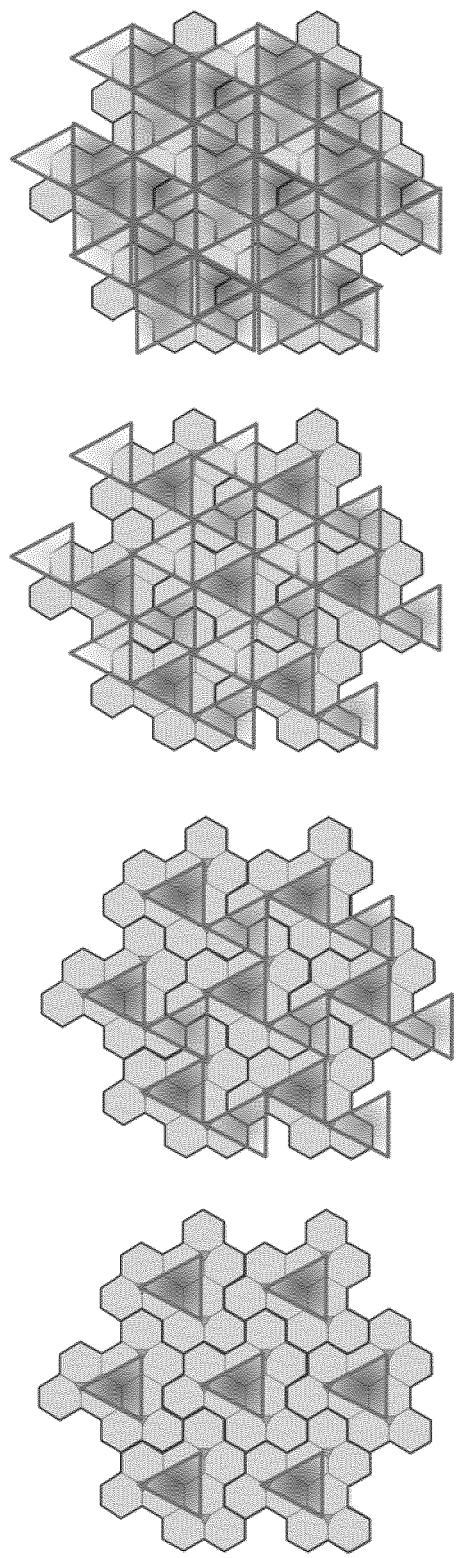
FIG. 1 shows a diagram illustrating shifted CAs in regular cell layout.
Figure 2:
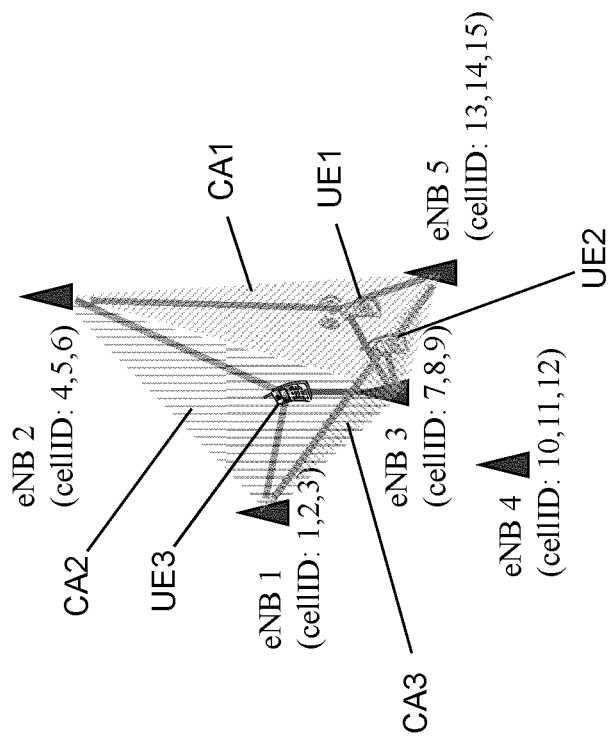
FIG. 2 shows a diagram illustrating an example of potential CAs formed from measurement reports of UEs, according to an exemplary embodiment of the present invention.

FIG. 2 illustrates an example of potential CAs formed from measurement reports of UEs. As shown in FIG. 2, three different potential CAs CA1, CA2 and CA3 are formed for UEs UE1, UE3 and UE2 served by the same eNB, i.e. eNB3 in this example.

CA1 is formed by eNBs eNB3, eNB2 and eNB5. CA2 is formed by eNB3, eNB1 and eNB2. CA3 is formed by eNB3, eNB1 and eNB5. eNB4 shown in FIG. 2 is not involved in the potential CAs.

Figures 3A, 3B, 3C:
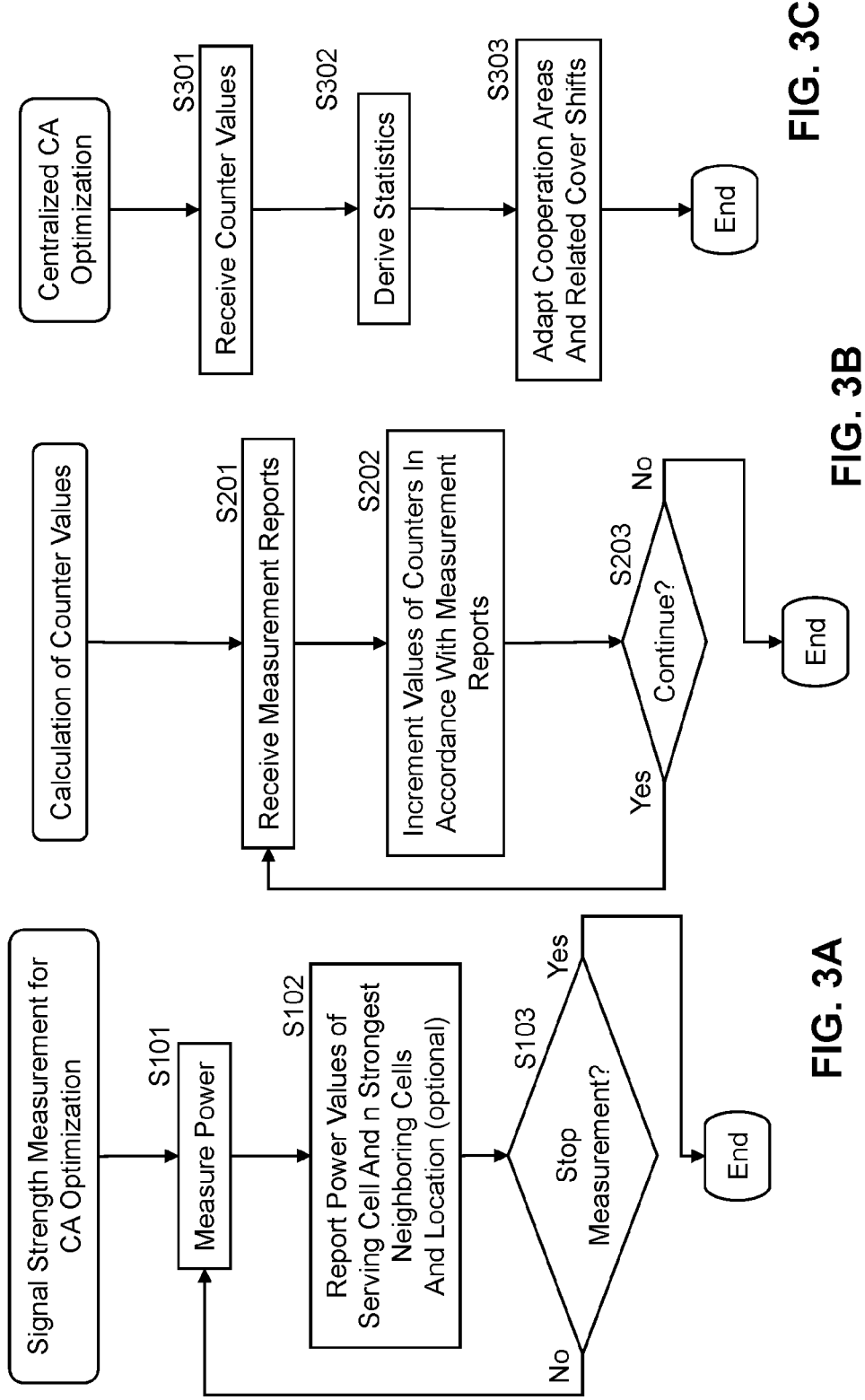
FIG. 3A shows a flowchart illustrating a process of signal strength measurement for CA optimization according to an exemplary embodiment of the invention.
FIG. 3B shows a flowchart illustrating a process of calculation of counter values according to an exemplary embodiment of the invention.
FIG. 3C shows a flowchart illustrating a process of a centralized CA optimization according to an exemplary embodiment of the invention.

Referring to FIG. 3A, in step S101, the UE1 in the example of FIG. 2 may measure, over a short time period, signal strengths respectively received from cells of a cellular communications network system, the cells comprising a first cell, i.e. the cell controlled by the eNB3 in this example, serving the UE1 and second cells not serving the user equipment, present in the neighborhood of the first cell, i.e. cells respectively controlled by the eNB1, eNB2, eNB4 and eNB5.

In step S102, the UE1 may report, to the eNB3, a first signal strength value corresponding to a signal strength received from the eNB3. As shown in FIG. 2, the measurement report of the UE1 includes a signal strength value, RSRP_X in this example, for the serving cell with cell ID 8 controlled by eNB3. In addition, the UE1 may report to the eNB3 n second signal strength values corresponding to signal strengths received from n second cells corresponding to the n strongest signal strengths measured from the neighboring non-serving cells (second cells), n being an integer greater than one.

Referring to the example of FIG. 2, n=2 and the two strongest signal strengths are received from second cells controlled by eNB2 and eNB5. Hence, the measurement report includes RSRP_Y for neighboring non-serving cell 1 with cell ID 5 controlled by eNB2, and RSRP_Z for neighboring non-serving cell 2 with cell ID 15 controlled by eNB5.

In step S103, in case the UE is not instructed to stop the measuring and reporting, the process may return to step S101. Otherwise, the process may end.

Similarly, the UE2 may report, to the eNB3, a first signal strength value corresponding to a signal strength received from the eNB3. As shown in FIG. 2, the measurement report of the UE2 includes a signal strength value RSRP_A for the serving cell with cell ID 8 controlled by the eNB3. In addition, the UE2 may report to the eNB3 two second signal strength values corresponding to signal strengths received from two second cells corresponding to the two strongest signal strengths measured from the second cells. Referring to the example of FIG. 2, the two strongest signal strengths are received from second cells controlled by eNB5 and eNB1. Hence, the measurement report includes RSRP_B for neighboring non-serving cell 1 with cell ID 15 controlled by eNB5, and RSRP_C for neighboring non-serving cell 2 with cell ID 1 controlled by eNB1.

Finally, the UE3 may report, to the eNB3, a first signal strength value corresponding to a signal strength received from the eNB3. As shown in FIG. 2, the measurement report of the UE3 includes a signal strength value RSRP_U for the serving cell controlled by with cell ID 9 eNB3. In addition, the UE3 may report to the eNB3 two second signal strength values corresponding to signal strengths received from two second cells corresponding to the two strongest signal strengths measured from the second cells. Referring to the example of FIG. 2, the two strongest signal strengths are received from second cells controlled by eNB1 and eNB2. Hence, the measurement report includes RSRP_V for neighboring non-serving cell 1 with cell ID 2 controlled by eNB1, and RSRP_W for neighboring non-serving cell 2 with cell ID 6 controlled by eNB2.

Figure 4:
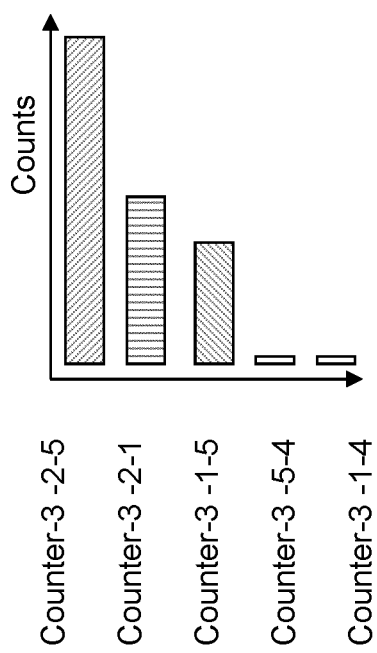
FIG. 4 shows a diagram illustrating an example of counters held in eNB for potential CAs of UEs connected with the eNB, according to an exemplary embodiment of the invention.

Following the example of FIG. 2, FIG. 4 shows counters held in eNB3. The counters may be defined with respect to the strongest cells.

Referring to FIG. 3B, in step S201 the eNB3 may repeatedly receive the above-described measurement reports from UE1, UE2 and UE3. In step S202 the eNB3 may increment a value of a counter which may correspond to the potential cooperation area formed by the serving cell controlled by the eNB3 and the two strongest neighboring cells included in the measurement reports. These cells may belong to same or different eNBs.

In step S203 it may be checked by the eNB3 if a statistical evaluation period, i.e. a time interval for calculation of counter values, is to be continued, and if YES, the process may return to step S201. If NO, the process may end.

Now referring to FIG. 4, the eNB3 has configured a counter 3-2-5, counter 3-2-1, counter 3-1-5, counter 3-5-4 and counter 3-1-4. The counter 3-2-5 corresponds to CA1, counter 3-2-1 corresponds to CA2, and counter 3-1-5 corresponds to CA3. Similarly, counter 3-5-4 corresponds to a CA formed by a cell controlled by eNB3, a cell controlled by eNB5 and a cell controlled by eNB4, and counter 3-1-4 corresponds to a CA formed by a cell controlled by eNB3, a cell controlled by eNB1 and a cell controlled by eNB4.

While the UE1, UE2 and UE3 report their measurements of the strongest cells, the eNB3 may increment the counter corresponding to the potential CA given by the reported cell IDs in the measurement reports including the information as shown in FIG. 2. The counter 3-2-5 receives most counts, followed by counter 3-2-1 and counter 3-1-5. In other words, CA1 receives the most counts, followed by CA2 and CA3.

Figure 5:
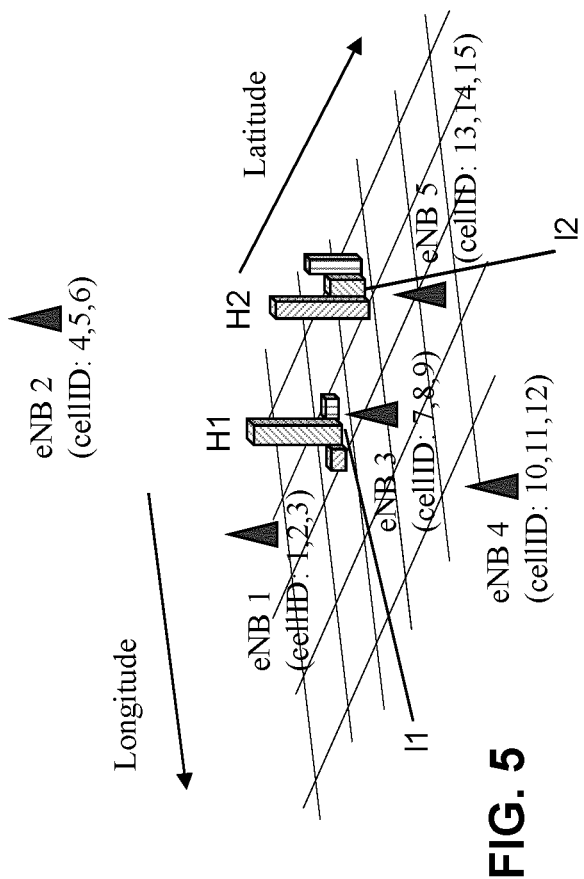
FIG. 5 shows a diagram illustrating an example of location specific CA histograms, according to an exemplary embodiment of the invention.

In case location information of the UEs is available, the count values of the counters can be interpreted as a histogram of potential CAs as shown in FIG. 5. The eNB3 may receive the location information from the UE1, UE2 and UE3, i.e. the UEs may report, to the eNB3, together with the signal strength values, their respective location at the time of measuring the signal strengths.

In FIG. 5 the eNBs are shown at their respective location in the coverage area, indicated by longitude and latitude, and two histograms H1 and H2 are shown at locations l1 and l2 in the area. The histogram H1 at location l1 shows that CA3 is preferred by UEs present at location l1, followed by CA1 and CA2. The histogram H2 at location l2 shows that CA1 is preferred by UEs present at location l2, followed by CA2 and CA3.

According to an exemplary embodiment of the invention, the UE measurements may be collected for cover shifts in combination with the tortoise concept. One option to take the tilt optimization into account may be to use two or more sets of fixed tilt constellations for the potential CAs and label the counters with an index indicating the set of a used tilt constellation. The tilt constellations may be configured before a dedicated measurement period and may therefore be known on network side. The counters as described above may be built for a dedicated measuring period referring to a dedicated set of tilt constellations and these counters may be labeled with a corresponding index. In case of a decentralized "crystallization process" to be described below the tilt constellations to be tested may have to be exchanged between the neighboring eNBs.

In other words, the counters may be built for predetermined measuring periods corresponding to predetermined tilt constellations of transmit antennas of the first cell (e.g. controlled by eNB3) and the second cells (e.g. controlled by eNB1, eNB2, eNB4, eNB5). An indication may be included to each counter indicating a tilt constellation of the predetermined tilt constellations, which is used at the time the UEs measure the signal strengths.

The same CAs could be counted at another eNB belonging to the regarded CA, e.g. counter 3-2-5 can be collected both in eNB2 and eNB5. Therefore, the counters built in the eNB may not be directly used there for optimization, but may be reported to a central unit which is controlling a larger dedicated part of serving area. The reports from all eNBs may be combined to a global statistic of potential CAs. Based on the counters the optimal CoMP areas and cover shifts may be determined.

In other words, referring to FIG. 3C, according to an exemplary embodiment of the invention, in step S301 the central unit may receive from each cell of a group of cells, e.g. controlled by the eN1-eNB5, values of counters. The values of the counters may have been calculated as described above with respect to FIGS. 2-4. In step S302, the central unit may derive statistics from the values of the counters corresponding to respective potential cooperation areas obtained from the measurement reports from the user equipments, for a plurality of locations covered by the group of cells. In step S303, the central unit may adapt cooperation areas and related cover shifts based on the statistics.

The counters may be associated with location information about locations of the UEs at the time the UEs measure the signal strengths. Alternatively or in addition, the counters may indicate a tilt constellation of predetermined tilt constellations, which is used at the time the UEs measure the signal strengths. The central unit then may use the location information and/or the tilt constellation when deriving the statistics.

From architecture perspective, the SON algorithm abovementioned for configuration and optimization of CA areas and cover shifts can be handled both in a centralized entity where ideally the optimal network CA and cover shift deployment is determined or a locally starting optimization process where the optimal deployment is developing like in a crystallization process. For the latter case, the process can be accelerated by starting from several geographically far dispersed cells (so-called condensation nuclei). In other words, in the decentralized case the eNB3 in the example of FIG. 2, instead of reporting the values of the counters which may be associated with the location information and/or have indicated the tilt constellation to a unit controlling the eNB1-eNB5, the eNB3 may perform steps S302 and S303 of FIG. 3C.

Decentralized self-organization of CAs (crystallization at certain condensation nuclei) may require new SON-related messages being exchanged between nodes. Determination of condensation nuclei may be handled in a centralized manner, but the announcement of neighboring cells to become part of the cooperation area and specific cover shift may require new inter-node messaging over X2 or S1.

The disadvantage is the generation of several smaller "crystals" instead of one large homogeneous "crystal" for a centralized approach. That is, UEs at borders of these small "crystals" may not fit to any of the developed CAs and cover shifts (CS-AL) and suffer from inter-cover-shift interference. A solution to overcome this issue may be the introduction of dedicated reserved cover shifts, a so-called ESCAPE-CS-AL (Escape Cover Shift resource allocation in frequency and/or time). The total of the CS-AL plus the ESCAPE-CS-AL may contain the full set of frequency and/or time resources.

It may be also part of the auto-configuration and self-optimization algorithm, to determine whether or not an ESCAPE-CS-AL is required, and if it is the case, to determine how large the ESCAPE-CS-AL should be.

In case of Heterogeneous Networks, CAs, CS-ALs, as well as a single ESCAPE-CS-AL may be insufficient. In that case, the available resources in frequency and/or time may be split into two or more sub-spaces each having own CAs and own CS-ALs.

Further aspects refer to reconfiguration of the CA and cover shift deployment in case new eNBs are added to the network or temporarily switched on and off for energy saving reasons. In case of the decentralized approach the reconfiguration can be restricted to small "crystals". In this case the centralized approach may be more complex, since complete new network wide configuration may have to be set up.

Efficient resource utilization per CA and CS-AL depending on load and traffic situation may be achieved by more flexible resource partitioning among the cover shifts, provided that load information is analyzed in parallel by the eNBs and reported to the responsible SON entity where the corresponding SON algorithm may lead to smart resource reuse patterns.

Figure 6:
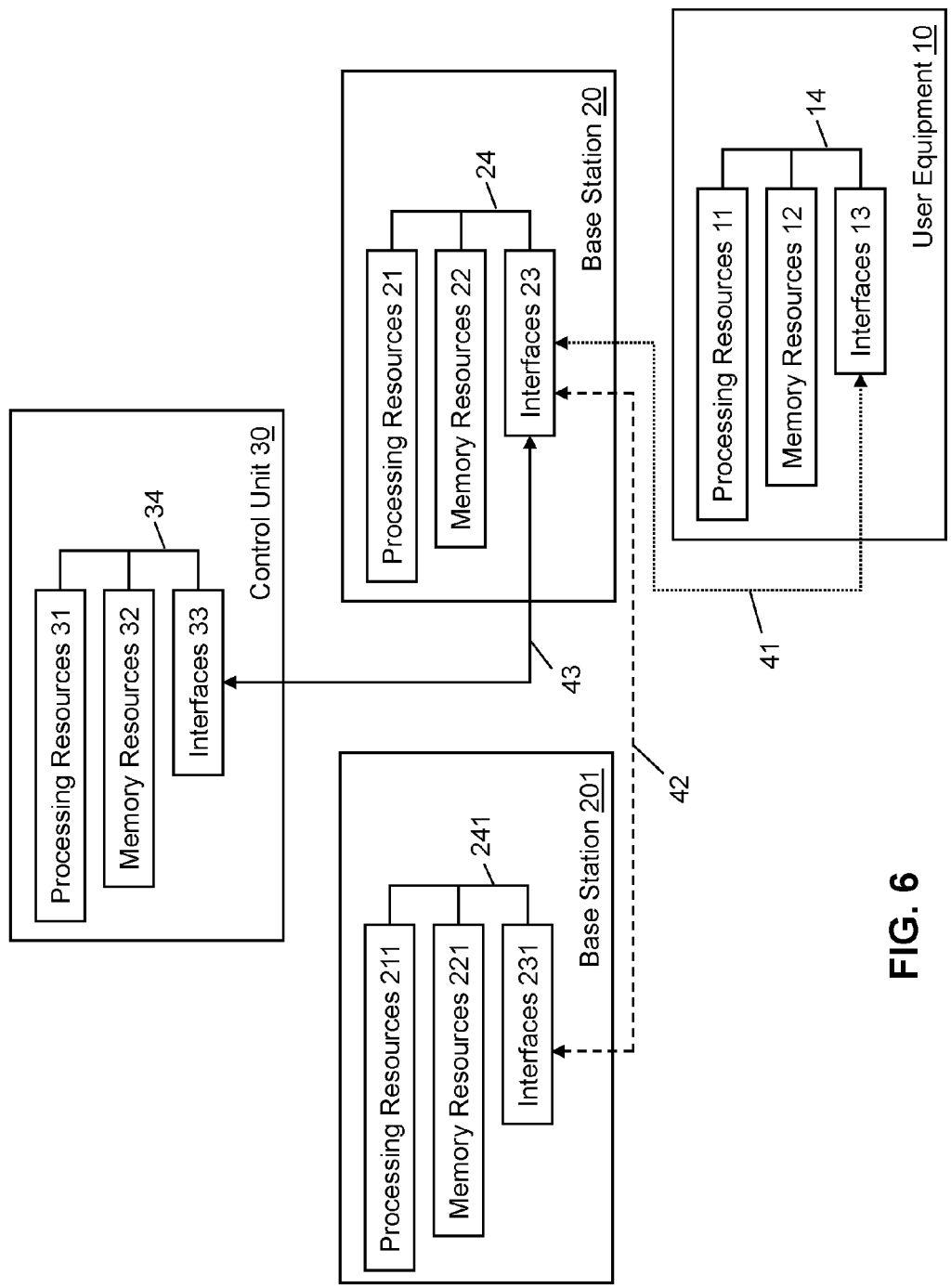
FIG. 6 shows a simplified block diagram of various electronic devices that are suitable for use in practicing the exemplary embodiments of this invention.

Now reference is made to FIG. 6 for illustrating a simplified block diagram of various electronic devices that are suitable for use in practicing the exemplary embodiments of this invention.

A user equipment 10 may comprise processing resources 11, memory resources 12 and interfaces 13, connected by a link 14. The memory resources 12 may store a program, and the interfaces 13 may include a suitable radio frequency (RF) transceiver coupled to one or more antennas (not shown) for bidirectional wireless communications over one or more wireless links 41 with a base station 20.

The base station 20 may comprise processing resources 21, memory resources 22 and interfaces 23, connected by a link 24. The memory resources 22 may store a program, and the interfaces 23 may include a suitable radio frequency (RF) transceiver coupled to one or more antennas (not shown) for bidirectional wireless communications over the wireless link(s) 41 with the user equipment 10. Moreover, the interfaces 23 may include one or more (hardwire) links 42 to another base station 201 and one or more (hardwire) links 43 to a control unit 30.

The base station 201 may comprise processing resources 211, memory resources 221 and interfaces 231, connected by a link 241. The memory resources 221 may store a program, and the interfaces 231 may include a suitable radio frequency (RF) transceiver coupled to one or more antennas (not shown) for bidirectional wireless communications. Moreover, the interfaces 231 may include the links 42 to the base station 201 and one or more (hardwire) links (not shown) to the control unit 30.

The control unit 30 may comprise processing resources 31, memory resources 32 and interfaces 33, connected by a link 34. The memory resources 32 may store a program, and the interfaces 33 may include the links 43 to the control unit 30.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memory resources 12, 22, 221, 32 is assumed to include program instructions that, when executed by the associated processing resources 11, 21, 211, 31 enable the electronic device to operate in accordance with the exemplary embodiments of this invention, as detailed above. For example, the user equipment 10 operates as the UE1, UE2 or UE3 shown in FIG. 2, or executes the process shown in FIG. 3A by use of the processing resources 11, memory resources 12 and interfaces 13. The base station 20 may operate as the eNB1, eNB2, eNB3, eNB4 or eNB5, or execute the process shown in FIG. 3B by use of the processing resources 21, memory resources 22 and interfaces 23. The control unit 30 may operate as the central unit described above, or execute the process shown in FIG. 3C by use of the processing resources 31, memory resources 32 and interfaces 33. In case of the decentralized approach, the base station 20 may exchange information with the base station 201 via the link 42, the base station 20 using the processing resources 21, memory resources 22 and interfaces 23, and the base station 201 using the processing resources 211, memory resources 221 and interfaces 231.

Inherent in the processing resources 11, 21, 211, 31 is a clock to enable synchronism among the various apparatus for transmissions and receptions within the appropriate time intervals and slots required, as the scheduling grants and the granted resources/subframes are time dependent. The transceivers include both transmitter and receiver, and inherent in each is a modulator/demodulator commonly known as a modem. The processing resources 21, 211, 31 also are assumed to each include a modem to facilitate communication over the (hardwire) links 42 and 43.

The exemplary embodiments of this invention may be implemented by computer software stored in the memory resources 12, 22, 221, 32 and executable by the respective processing resources 11, 21, 211, 31, or by hardware, or by a combination of software and/or firmware and hardware in any or all of the devices shown.

In general, the various embodiments of the user equipment 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

According to an aspect of the invention, a user equipment, e.g. the user equipment 10 shown in FIG. 6, may comprise means for measuring, over a short time period, signal strengths respectively received from cells of a cellular communications network system, the cells comprising a first cell serving the user equipment and second cells not serving the user equipment, present in the neighborhood of the first cell, means for reporting, to an entity controlling the first cell, a first signal strength value corresponding to a signal strength received from the first cell and n second signal strength values corresponding to signal strengths received from n second cells corresponding to the n strongest signal strengths measured from the second cells, n being an integer greater than one, and means for repeating the measuring and reporting. The means for measuring, reporting and repeating may be implemented by the processing means 11, memory means 12 and interfaces 13.

The means for reporting may report to the entity controlling the first cell, together with the signal strength values, a location of the user equipment at the time the means for measuring measures the signal strengths.

According to an aspect of the invention, an apparatus of a cellular communications network system comprising a plurality of cells including the apparatus' cell as a first cell and second cells different from and present in the neighborhood of the first cell, e.g. the base station 20 shown in FIG. 6, may comprise means for repeatedly receiving measurement reports from user equipments, each including a first signal strength value corresponding to a signal strength measured from the first cell over a short time period and n second signal strength values corresponding to signal strengths measured over the short time period from n second cells, which correspond to the n strongest signal strengths measured from the second cells, n being an integer greater than one, and means for incrementing a value of a counter which corresponds to a potential cooperation area formed by the first cell corresponding to the first signal strength value and the n second cells corresponding to the n second signal strength values.

The apparatus may further comprise means for obtaining location information about locations of the user equipments at the time the user equipments measure the signal strengths, and means for associating counters with the location information.

The means for obtaining may obtain the location information from the measurement reports.

The apparatus may further comprise means for including an indication to each counter, which indicates a tilt constellation used at the time the user equipments measure the signal strengths, wherein the tilt constellation is part of predetermined tilt constellations of transmit antennas of the first cell and the second cells, which are configured for predetermined measuring periods.

The apparatus may further comprise first means for reporting values of the counters to an entity, which controls the apparatus and other apparatuses controlling the second cells.

The apparatus may further comprise means for generating measurement information representing statistics given by values of the counters corresponding to respective potential cooperation areas obtained from the measurement reports from the user equipments, and second means for reporting the measurement information to other apparatuses controlling the second cells, and means for adapting cooperation areas and related cover shifts based on the measurement information and/or other measurement information received from the other apparatuses. Alternatively or in addition, the first means for reporting may report the measurement information to the entity controlling the apparatus and the other apparatuses.

The means for repeatedly receiving, incrementing, obtaining, including, the first means for reporting, the second means for reporting and the means for generating and adapting may be implemented by the processing means 21, memory means 22 and interfaces 23.

According to an aspect of the invention, a unit controlling a group of cells of a cellular communications network system, e.g. the control unit 30 shown in FIG. 6, may comprise means for, from each cell of the group, receiving values of counters, wherein a value of each counter has been calculated from measurement reports from user equipments received by the cell as a first cell serving a user equipment, each measurement report including a first signal strength value corresponding to a signal strength measured from the first cell over a short time period and n second signal strength values corresponding to signal strengths measured over the short time period from n second cells which correspond to the n strongest signal values measured from the second cells of the group not serving the user equipment, present in the neighborhood of the first cell, n being an integer greater than one, wherein each counter corresponds to a potential cooperation area formed by the first cell and n of the second cells, and wherein the value has been calculated by incrementing a counter, which corresponds to the potential cooperation area formed by the first cell corresponding to the first signal strength value and the n second cells corresponding to the n second signal strength values, means for deriving statistics from the values of the counters corresponding to respective potential cooperation areas obtained from the measurement reports from the user equipments, for a plurality of locations covered by the group of cells, and means for adapting cooperation areas and related cover shifts based on the statistics.

The means for receiving may receive the values of the counters which are associated with location information about locations of the user equipments at the time the user equipments measure the signal strengths and/or the values of the counters indicating a tilt constellation of predetermined tilt constellations, which is used at the time the user equipments measure the signal strengths. The apparatus may further comprise means for using the location information and/or the tilt constellation when the means for deriving derive the statistics. The means for receiving, deriving, adapting and using may be implemented by the processing means 31, memory means 32 and interfaces 33.

It is to be understood that the above description of exemplary embodiments is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a cellular communications network system comprising a plurality of cells including a serving cell serving the apparatus and one or more neighboring cells different from and present in the neighborhood of the serving cell, the method including a processing device to execute software code to perform the method, the method comprising:
repeatedly receiving measurement reports from one or more user equipment, each measurement report including a first signal strength value indicating a signal strength measured from the serving cell over a short time period and n second signal strength values indicating the n strongest signal strengths measured from the neighboring cells, n being an integer greater than one;
incrementing a value of a counter representing a cooperation area formed by the serving cell and the n neighboring cells; and
providing a coordinated transmission to the apparatus from the cells of the cooperation area.

2. The method of claim 1, comprising:
obtaining location information about locations of the one or more user equipment at the time the user equipment measure the signal strengths; and
associating counters with the location information.

3. The method of claim 2, comprising:
obtaining the location information from the measurement reports.

4. The method of claim 1, comprising:
including an indication to each counter, which indicates a tilt constellation used at the time the one or more user equipment measure the signal strengths, wherein the tilt constellation is part of predetermined tilt constellations of transmit antennas of the serving cell and the neighboring cells, which are configured for predetermined measuring periods.

5. The method of claim 1, comprising:
reporting values of the counters to an entity, which controls the apparatus and other apparatuses controlling the neighboring cells.

6. The method of claim 1, comprising:
generating measurement information representing statistics given by values of the counters representing cooperation areas obtained from the measurement reports from the one or more user equipment;
reporting the measurement information to other apparatuses controlling the neighboring cells, and adapting cooperation areas and related cover shifts based on the measurement information; and
reporting the measurement information to an entity controlling the apparatus and the other apparatuses.

7. A method for use by a unit controlling a group of cells of a cellular communications network system, the unit including a processing device to execute software code to perform the method, the method comprising:
receiving, from each cell of the group, values of counters, wherein a value of each counter has been calculated from measurement reports from user equipment received by the cell as a serving cell serving a user equipment, each measurement report including a first signal strength value indicating a signal strength measured from the serving cell over a short time period and n second signal strength values indicating the n strongest signal values measured from the neighboring cells of the group not serving the user equipment, present in the neighborhood of the serving cell, n being an integer greater than one, wherein each counter represents a cooperation area formed by the serving cell and n of the neighboring cells, and wherein the value has been calculated by incrementing a counter representing a cooperation area formed by the serving cell and the n neighboring cells;

deriving statistics from the values of the counters representing respective cooperation areas obtained from the measurement reports from the user equipment, for a plurality of locations covered by the group of cells;

adapting cooperation areas and related cover shifts based on the statistics; and providing a coordinated transmission to the user equipment from the cells of one of the cooperation areas.

8. The method of claim 7, comprising:

receiving the values of the counters which are associated with location information about locations of the user equipment at the time the user equipment measure the signal strengths and/or the values of the counters indicating a tilt constellation of predetermined tilt constellations, which is used at the time the user equipment measure the signal strengths; and using the location information and/or the tilt constellation when deriving the statistics.

9. An apparatus of a cellular communications network system comprising a plurality of cells including a serving cell serving the apparatus and one or more neighboring cells different from and present in the neighborhood of the serving cell, the apparatus comprising:

a processing device;

at least one memory storing software code, the at least one memory and the software code configured, with the processing device, to cause the apparatus to perform at least the following:

repeatedly receive measurement reports from one or more user equipment, each measurement report including a first signal strength value indicating a signal strength measured from the serving cell over a short time period and n second signal strength values indicating the n strongest signal strengths measured from the neighboring cells, n being an integer greater than one;

increment a value of a counter representing a cooperation area formed by the serving cell and the n neighboring cells; and provide a coordinated transmission to the apparatus from the cells of the cooperation area.

10. The apparatus of claim 9, wherein the at least one memory, the software code and the processing device are further configured to cause the apparatus to:

obtain location information about locations of the one or more user equipment at the time the user equipment measure the signal strengths; and associate counters with the location information.

11. The apparatus of claim 10, wherein the at least one memory, the software code and the processing device are further configured to cause the apparatus to:

obtain the location information from the measurement reports.

12. The apparatus of claim 9, wherein the at least one memory, the software code and the processing device are further configured to:

include an indication to each counter, which indicates a tilt constellation used at the time the one or more user equipment measure the signal strengths, wherein the tilt constellation is part of predetermined tilt constellations of transmit antennas of the serving cell and the neighboring cells, which are configured for predetermined measuring periods.

13. The apparatus of claim 9, wherein the at least one memory, the software code and the processing device are further configured to:

report values of the counters to an entity, which controls the apparatus and other apparatuses controlling the neighboring cells.

14. The apparatus of claim 9, wherein the at least one memory, the software code and the processing device are further configured to perform at least one of the following:

generate measurement information representing statistics given by values of the counters representing cooperation areas obtained from the measurement reports from the one or more user equipment;

report the measurement information to other apparatuses controlling the neighboring cells, and adapt cooperation areas and related cover shifts based on the measurement information; and report the measurement information to an entity controlling the apparatus and the other apparatuses.

15. A unit controlling a group of cells of a cellular communications network system, the unit comprising:

a processing device;

at least one memory storing software code, the at least one memory and the software code configured, with the processing device, to cause the apparatus to perform at least the following:

receive, from each cell of the group, values of counters, wherein a value of each counter has been calculated from measurement reports from user equipment received by the cell as a serving cell serving a user equipment, each measurement report including a first signal strength value indicating a signal strength measured from the serving cell over a short time period and n second signal strength values indicating the n strongest signal values measured from the cells of the group not serving the user equipment, present in the neighborhood of the serving cell, n being an integer greater than one, wherein each counter represents a cooperation area formed by the serving cell and n of the neighboring cells, and wherein the value has been calculated by incrementing a counter representing a cooperation area formed by the serving cell and the n neighboring cells;

derive statistics from the values of the counters representing respective cooperation areas obtained from the measurement reports from the user equipment, for a plurality of locations covered by the group of cells;

adapt cooperation areas and related cover shifts based on the statistics; and providing a coordinated transmission to the user equipment from the cells of one of the cooperation areas.

16. The unit of claim 15, wherein the at least one memory, the software code and the processing device are further configured to cause the apparatus to:

receive the values of the counters which are associated with location information about locations of the user equipment at the time the user equipment measure the signal strengths and/or the values of the counters indicating a tilt constellation of predetermined tilt constellations, which is used at the time the user equipment measure the signal strengths; and use the location information and/or the tilt constellation when deriving the statistics.

* * * * *